Figure 1:
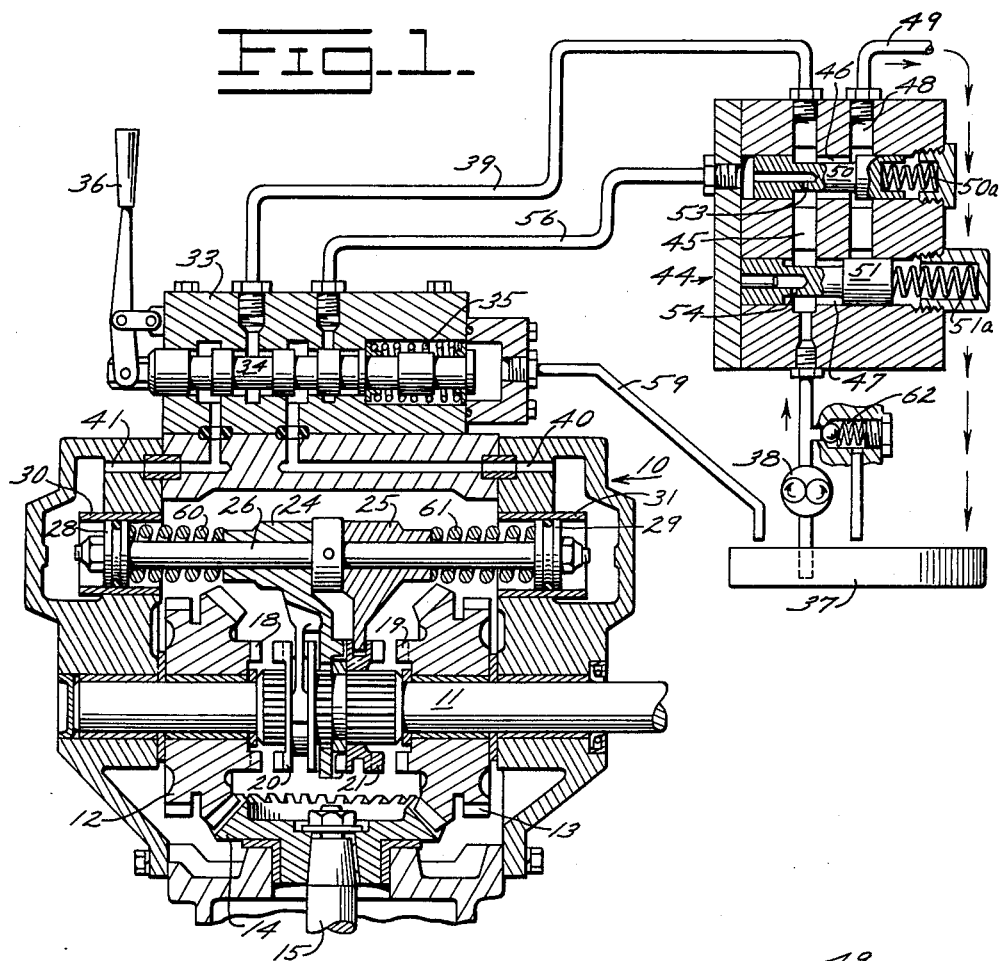

INVENTORS
PAUL B. BENNER
DUANE R. CHICOINE
LEONARD F. DICKESON
BY Fryer and Zimrold
ATTORNEYS United States Patent Office
3,088,488
Patented May 7, 1963

3,088,488
HYDRAULIC CONTROL SYSTEM WITH PRESSURE CONTROL VALVE
Paul B. Benner and Duane R. Chicoine, Decatur, Ill., and Leonard F. Dickeson, Wichita, Kans., assignors to Caterpillar Tractor Co., Peoria, Ill., a corporation of California
Filed Dec. 14, 1960, Ser. No. 75,748
4 Claims. (Cl. 137—621)

This invention relates to hydraulic control systems of the kind employed as actuating systems for the controls of earthmoving equipment and the like.

In some equipment, controls are powered from a power take-off shaft of an engine which serves to drive the equipment. For example in many motor graders, the raising, lowering, revolving and tilting of the cutting blade, as well as other adjustments are made through rotatable shafts adapted to be connected with a power shaft driven by the engine through positive drive dog clutches. Engagement and disengagement of these clutches is accomplished manually through appropriate shifting levers and in some cases hydraulic means are employed. Because of the type of clutches employed, the operator effort required to effect their engagement is high and high loading tends to throw them out of engagement causing what is known as "kick back" of the lever which presents a dangerous condition. It is desirable, therefore, that high pressure hydraulic systems be employed for actuating such controls. High pressure hydraulic systems for this type of service are costly to operate and maintain because of the necessity for maintaining constant pressure in the system for only occasional actuation of the control. This necessitates a pump being operated constantly against a high pressure head expending high motive power and causing rapid wear of pump bearings and other operating parts.

It is an object of the present invention to provide a hydraulic system for actuating controls in which a pump normally maintains a low pressure head throughout the system assuring the presence of fluid under pressure at all critical points for immediate response to actuation of the controls and in which actuation of a control automatically effects instant increase in the pressure within the system.

A further object of the invention is to provide a valve assembly for use in such a system which insures instant variation between low and high pressure conditions automatically in response to actuation of a control lever.

Through the system of the present invention, the hydraulic control circuit can be maintained at a pressure level of 100 pounds, more or less, during normal operation of a machine and momentarily increased to 700 or 800 pounds when a control lever is actuated. This insures adequate pressure for quick positive actuation of the hydraulically actuated control without unnecessary waste of power and wear of the pump and its related parts.

Further and more specific objects and advantages of the invention and the manner in which it is carried into practice are made apparent in the following specification wherein reference is made to the accompanying drawing.

Figure 2:
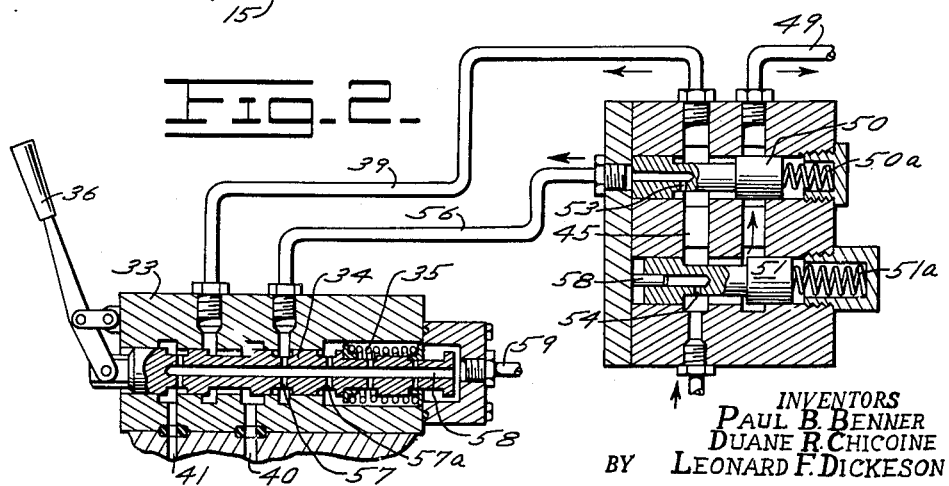

In the drawing:

FIG. 1 is a sectional view through a conventional type of forward-reverse power transmission and through a control valve therefor also showing schematically the hydraulic system including a view in section of an automatic dual pressure control valve which forms part of the present invention; and FIG. 2 is a sectional view of the control valve and automatic dual pressure control valve illustrating different positions which the parts assume under different operating conditions.

The forward and reverse transmission herein illustrated is of a conventional type which is fully disclosed in a pending application for United States Letters Patent of Russell D. Page for "Locking Mechanism for Power Transmission," Serial No. 784,921, filed January 5, 1959, now Patent No. 2,967,596. It is contained in a housing, generally indicated at 10 within which is mounted a driven shaft 11 extending outwardly through one side of the housing where, in practice, it is connected with some part to be controlled. Such part, for example, may be the scraper blade or other controlled member on a road grading machine and mechanism not shown is employed for raising the blade upon rotation of the shaft 11 in one direction and lowering the blade upon its rotation in the opposite direction.

Rotary movement is imparted to the output shaft 11 through either one of a pair of bevel gears 12 and 13, freely rotatable on the shaft and constantly driven in opposite directions by a meshing bevel gear 14. The gear 14 is carried on a shaft 15 connected through mechanism, not shown, with a suitable power take-off shaft of a diesel engine or other prime mover of the road grading machine.

The bevel gears 12 and 13 being thus driven in opposite directions, connection of either one or the other with the driven shaft 11 is effective to impart rotary motion thereto selectively in opposite directions. Each of the gears 12 and 13 is provided with a toothed clutch face as indicated at 18 and 19, respectively, and a pair of clutch shifting collars 20 and 21 is slidably but non-rotatably carried by the driven shaft 11 through the medium of splined connections as shown. The clutch collars 20 and 21 are provided with toothed clutch faces for engagement with the clutch faces 18 and 19 of the gears 12 and 13. A pair of shifting forks 24 and 25 is slidably mounted on a shifting rod 26 which is axially movable to effect selective engagement of the clutches described for imparting either forward or reverse rotation to the shaft 11. Springs 60 and 61 normally hold the shifting forks in the positions where the clutches are disengaged.

In the present case, axial movements is imparted to the shifting rod 26 by hydraulic pressure in a fluid motor which comprises a pair of pistons 28 and 29 suitably fixed to opposite ends of the rod 26 and slidably disposed in cylinders 30 and 31, respectively, herein illustrated as sleeves inserted in bores in the housing 10.

A control valve 33 for selectively directing fluid under pressure to the pistons 28 and 29 of the fluid motor comprises a body with a suitable bore for the reception of a spool 34 normally held in a central position by a well-known type of centering spring 35. The spool is adapted to be moved axially in either direction by a control lever 36. Fluid from a supply tank 37 is supplied under pressure by a pump 38 and flows through a line 39 to the bore of the valve 33. Upon actuation of the valve spool toward the right as shown in FIG. 2, the relationship of the lands on the spool 34 and the cavities and passages communicating with the bore of the valve is such that pressure in the line 39 is communicated through connecting passages indicated at 40 with the right hand piston 29 to effect engagement of the transmission gears as previously described to drive the shaft 11 in one direction. As is apparent from the relationship of the spool and passages shown, similar movement of the spool 34 to the left will communicate pressure from the line 39 through passages 41 to the piston 28 for effecting drive of the shaft 11 in the opposite direction.

In order to insure the presence of hydraulic fluid under moderate pressure in all parts of the system when the control valve 33 is in a neutral position, and the immediate increase of the pressure to a satisfactory operating level when the control valve is moved to actuate the pistons 28 or 29, the valve assembly generally indicated at 44 is interposed between the pump 38 and control valve 33 in the main supply line 39. The valve assembly 44 has a bore 45 for direct communication of pressure to the line 39 and this bore is intercepted by two transverse bores 46 and 47 which communicate with a discharge bore 48 and discharge line 49 for returning fluid to the sump 37. Communication between the bore 45 and the discharge bore 48 is controlled by two spring loaded valves, one shown at 50 in the bore 46 and one at 51 in the bore 47. Each of these valves has a stem with enlarged piston-like ends slidably fitting its bore and one of which is hollow for the admission of fluid through an orifice shown at 53 in the valve 50 and 54 in the valve 51. Fluid under pressure from the pump 38 enters these orifices and opposes the force of valve springs 50a and 51a. This tends to open the valves in the manner of relief valves to permit the escape of fluid through discharge bore 48 and line 49 of the sump. The valve 50 acts as a low pressure relief valve and the valve 51 as a high pressure relief valve.

Assuming that the moderate or standby pressure in the system is established as 100 pounds with the control valve in its neutral position blocking the line 39 as shown in FIG. 1, valve 50 opens to return all fluid to the sump in excess of that required to maintain 100 pounds pressure in the system. The pressure behind the stem of the valve 50 which opens it is communicated through a line 56 with the control valve 33 and this line is also closed or blocked in the neutral position of the valve.

When the control valve is moved to either of its actuating positions, as toward the right as shown in FIG. 2, the line 56 is vented to the sump through radial bores 57 in the spool 34 communicating with an axial bore 58 and through the chamber of the spring assembly 35 to a line 59 communicating as shown in FIG. 1 with the sump. Thus actuation of the control valve instantly reduces the pressure behind the relief valve 50 which is closed by its spring so that the entire output of the pump is contained in the system until adequate pressure for positive actuation of the pistons is attained. Assuming this pressure to be 700 pounds or less, the relief valve 51 will open when pressure entering through its port 54 attains this value to maintain pistons 28 and 29 in their actuated positions.

While the springs which urge the valves 50 and 51 toward their closed position are of different size, the difference need not be proportional to the pressures at which the valves open as the pressure behind the valve 51 is confined to the cross sectional area of the hollow portion of its stem as by a pin 58 over which the stem slidably fits, whereas in the valve 50 the pressure acts against the full diameter of the enlarged portion of the valve stem. The relief valve 51 therefore serves in the manner described to insure a maximum pressure in the system during operation of the control valve 33 and to relieve pressure in excess of said maximum by its movement to the position illustrated in FIG. 2. A third relief valve shown at 62 in FIG. 1 may be employed if desired to protect the system against highly excessive pressures which might develop in the event of malfunction of the other valves and may be set to relieve pressure to the sump 37 if it attains the value for example of 1,000 pounds. Operation of the control valve 33 in the opposite direction from that illustrated in FIG. 2 is belived obvious from the foregoing description as it will vent the line 56 through ports shown at 57a and will effect communication of pressure in the main line 39 through the ports 41 to the piston 28 for adjustment of the transmission to effect rotation of the shaft 11 in the opposite direction.

The invention has been described herein as applied to a single transmission in the control system of a motor grader or the like but it is applicable to as many other transmissions as may be desired with the valve assembly shown at 44 connected to a common pressure inlet manifold serving a plurality of control valves and pistons.

The system herein disclosed also permits automaitic neutralizing of the transmission in the event of excessive loads being applied to the blade or other meachanism which is actuated by the shaft 11. It is conventional practice to taper or angle the teeth of the clutches or shifting collars in the transmission so that excessive loads produce a camming action which forces them out of engagement. Should this disengagement occur in the system of the present invention, fluid under pressure which is actuating either of the pistons 28 or 29 is free to escape back through the control valve and line 39 to the valve assembly 44 where it is relieved at maximum operating pressure through the relief valve 51.

We claim:

1. In a hydraulic control system for actuating a fluid motor which comprises a source of fluid under high pressure, a control valve, and a circuit for directing fluid pressure to said motor through said control valve, a low pressure relief valve and a high pressure relief valve both biased closed by spring pressure only, each relief valve including a chamber communicating with said source of fluid under pressure to bias it toward open position whereby the low pressure relief valve will insure low pressure in said circuit, and means operable upon operation of the control valve to direct pressure to the fluid motor to vent said low pressure relief valve chamber and establish pressure in the circuit controlled by said high pressure relief valve.

2. In a hydraulic control system comprising a source of high pressure fluid and a circuit including a fluid motor and a valve for controlling pressure to the motor, means to maintain low pressure in said circuit except upon actuation of the control valve to direct pressure to the motor comprising a relief valve between the source of pressure and the control valve, spring means constituting the sole source for biasing the relief valve toward closed position, pressure actuated means communicating with said pressure source to overcome the spring means and open the relief valve, and means operable upon such actuation of the control valve to vent said pressure actuated means and permit closing of the relief valve by the spring means.

3. The system defined in claim 2 wherein the relief valve comprises a piston reciprocable in a cylinder to control flow through a passage intersecting the cylinder, a spring at one end of the piston to bias it toward closed position, a passageway in the piston to admit fluid to the cylinder at its opposite end to overcome the spring pressure, and a vent line between the pressure end and the control valve.

4. The system defined in claim 3 including a second piston type relief valve with a heavier spring to limit high pressure in the system during actuation of the fluid motor.

References Cited in the file of this patent
UNITED STATES PATENTS

| | | |
|---|---|---|
| 2,654,349 | Ziskal | Oct. 6, 1953 |
| 2,856,960 | Stacey | Oct. 21, 1958 |
| 2,964,908 | Pomper et al. | Dec. 20, 1960 |